United States Patent
Park et al.

(10) Patent No.: US 6,529,882 B1
(45) Date of Patent: Mar. 4, 2003

(54) METHOD FOR MANAGING GROUP MEMBERSHIP IN INTERNET MULTICAST APPLICATIONS

(75) Inventors: Jung Soo Park, Taejon (KR); Yong Woon Kim, Taejon (KR); Seok Joo Koh, Taejon (KR); Yong Jin Kim, Taejon (KR)

(73) Assignee: Electronics and Telecommunications Research Institute, Taejon (KR)

( * ) Notice: Subject to any disclaimer, the term of this patent is extended or adjusted under 35 U.S.C. 154(b) by 0 days.

(21) Appl. No.: 09/499,915

(22) Filed: Feb. 8, 2000

(30) Foreign Application Priority Data

Nov. 3, 1999 (KR) .............................................. 99-48444

(51) Int. Cl.⁷ ............................................... G06F 17/60

(52) U.S. Cl. ........................................ 705/51; 709/223

(58) Field of Search .............. 705/51–52; 709/200–201, 709/223, 225, 227–230; 707/1–5

(56) References Cited

U.S. PATENT DOCUMENTS

| 6,275,859 B1 | * | 8/2001 | Wesley et al. ............... 709/229 |
| 6,370,142 B1 | * | 4/2002 | Pitcher et al. ............... 370/390 |

FOREIGN PATENT DOCUMENTS

| EP | 0 805 393 A2 | * | 11/1997 | ............. G06F/9/46 |
| WO | WO 98/48343 | * | 10/1998 | ............. G06F/3/14 |

OTHER PUBLICATIONS

Blazevic et al., Distributed Core Multicast (DCM): a multicast routing protocol for many groups with few receivers, ACM SIGCOMM Computer Communication Review Oct. 1999 vol. 29 Issue 5, pp. 6–21.*
Handley et al., "Session Description Protocol," IETF. RFC 2327: Apr. 1998.
Maher et al., "Session Announcement Protocol: Version 2," IETF: Nov. 1998.

* cited by examiner

Primary Examiner—James P. Trammell
Assistant Examiner—Mary Wang
(74) Attorney, Agent, or Firm—Seed IP Law Group PLLC

(57) ABSTRACT

A method for strictly managing group membership in Internet multicast applications is disclosed. The method comprises a group creation and enrollment step, a group announcement step, a group query step, a group information acquisition step, a group registration step, a leaving of the group step, a failure information response step and a fragment message transmission step. In the group creation and enrollment step, a group management server creates a group and performs group registration. In the group announcement step, the group management server announces the created group. In the group query step, the group management client inquires the group information of the group management server. In the group information acquisition step, the group management client joins a known group address and acquires the group information. In the group registration step, the group management client enrolls in the group management server. In the leaving of the group step, the group management client leaves the group. In the failure information response step, the group management server transmits information on a reason for failure to the group management. In the fragment message transmission step, the group management client transmits the fragment messages, while the group management server acquires the group information by assembling the fragment messages.

10 Claims, 6 Drawing Sheets

METHOD FOR MANAGING GROUP MEMBERSHIP IN INTERNET MULTICAST APPLICATIONS

TECHNICAL FIELD

The present invention relates, in general, to a method for strictly managing group membership in Internet multicast applications and, more particularly, to a method for strictly managing group membership in Internet multicast applications, capable of strictly managing group membership without revising the existing multicast applications by partially extending a session description protocol and providing a group management protocol that is able to perform a group management function.

BACKGROUND OF THE INVENTION

In a multicast application in which security is required and only specified users of a group may participate, the management of the participants of the group should be strictly performed. In particular, in a procedure, such as an Internet poll, precise participant information at a certain point of time is very important. Incidentally, although in the same multicast application, a case occurs in which a loosely managed group session is needed and a case also occurs in which a strictly managed group session is needed, as occasion demands.

As well known to those skilled in the art, conventional multicast applications are performed by means of protocols including an Internet Group Management Protocol (IGMP), a Session Description Protocol (SDP), a Session Announcement Protocol (SAP), a Session Initiation Protocol (SIP) and a multicast routing.

Using the IGMP, participants join a corresponding group address of a multicast router. Information, such as an encryption type of a multicast session, connection information, a session title, a connection point, etc. may be described in the form of text by means of the SDP. When the described contents are sent to a well-known multicast group address using the SAP, a SAP message sent by a sender arrives at all multicast routers, in which all joined users exist, along a multicast routing route and the participants of the group may find the message. The SIP serves to allow the creation of a new multicast session and the release of the multicast session, to invite non-participating users to join the group, and to make location information on session participants known.

In such a case, since no provision is made for limiting the qualification for joining in the multicast router, all persons who know a group address may participate. Additionally, there is a problem in which the multicast router, in which the IGMP is utilized, does not manage the information on who joins a certain address, but confirms whether a joiner exist or not regardless of the number of joiners. As a consequence, according to the conventional art, the strict management of the participants of a group is almost impossible because the participants of the group are managed loosely in the art.

SUMMARY OF THE INVENTION

Accordingly, the present invention has been made keeping in mind the above problems occurring in the prior art, and an object of the present invention is to provide a method for managing group membership in Internet multicast applications, capable of strictly managing group membership without revising the existing multicast applications by partially extending SDP and providing GMP that is able to perform a group management function.

In order to accomplish the above object, the present invention provides a method for strictly managing group membership in Internet multicast applications, comprising a group creation and enrollment step in which a group management server creates a group and performs group registration as a group management client requests a group registration by creating group information and transmitting the information to the group management when request for multicast group creation occurs; a group announcement step in which the group management server announces the created group using a multicast group address; a group query step in which the group management client which knows a group ID inquires the group information of the group management server and acquires a response; a group information acquisition step in which the group management client which does not know a group ID joins a known group address and acquires the group information that arrives at the known group address; a group registration step in which the group management client enrolls in the group management server as a participant; a group leaving step in which the group management client leaves the group by transmitting information for leaving the group to the group management server; a failure information response step in which the group management server transmits information on a reason for failure to the group management client when the group management server fails in processing a request for group creation, query, enrollment or leaving; and a fragment message transmission step in which the group management client divides the request and transmits the fragment messages, while the group management server acquires the group information by assembling the fragment messages.

Preferably, the group creation and enrollment step comprises a step in which a multicast application describes session description protocol information by transmitting group information to the group management client, a step in which the group management client performs a group creation process by transmitting a group creation session description protocol to the group management server when the group management client and the group management server exist in the same host, a step in which the group management client enrolls the group in the group management server by compressing or encrypting a session description protocol information on group creation and transmitting the session description protocol information to the group management message by means of a group management protocol message when the group management client and the group management server exist in different hosts, a step in which the group management server transmits a successful group registration response to the group management client by means of a group management protocol message, and a step in which the group management client informs the Internet multicast application of successful group registration.

Preferably, the group query step comprises a step in which the group management client describes a group ID and creates a query session description protocol information for requesting corresponding multicast group information, a step in which the group management client transmits the query session description information to the group management server by means of the group management protocol message, and a step in which the group management server which receives the query session description protocol information announces the group information through a TCP by means of the group management protocol message including a response information.

Preferably, the group registration step comprises a step in which the group management client describes participant enrollment information on an applicant for participation in a certain multicast group in the form of a session description protocol, a step in which the group management client performs a participant enrollment by transmitting the participant enrollment information to the group management server by means of the group management protocol message, and a step in which the group management server informs successful group registration of the applicant by means of the group management protocol message.

Preferably, the group leaving step comprises a step in which the group management client describes group leaving information in the form of a session description protocol, a step in which the group management client requests group leaving by transmitting the group leaving information to the group management server by means of the group management protocol message, and a step in which the group management server which received the group leaving information informs the applicant of successful leaving of the group by means of the group management protocol message.

Preferably, the failure information response step comprises a step in which the group management server describes failure information including error code about a reason of failure in the form of the session description protocol message when the group management server fails in processing the request for group creation, query, enrollment or leaving, and a step in which the group management server transmits the fail ure information to a service requester by means of the group management protocol message.

Preferably, the fragment message transmission step comprises a step in which the group management server describes the group information in the form of a session description protocol, a step in which the group management server divides the session description protocol and creates multiple session announcement protocol fragment messages, and a step in which an applicant for participation who received the session announcement protocol fragment messages assembles the session announcement protocol fragment messages including divided session description protocol information into original session description protocol information and acquires the group information.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE INVENTION

Referring to accompanying drawings, there is described a method for managing group membership in Internet multicast applications according to a preferred embodiment of the present invention, hereinafter.

The present invention enables Internet multicast applications capable of strictly managing group membership. To this end, a method for describing multicast group information and a method for transmitting the described information should be established. In the present invention, in order to embody the description method an SDP is extended, and in order to embody the transmission method a Session Announce Protocol (SAP) that is used in a User Datagram Protocol (UDP) and a Group Management Protocol (GMP) that is newly defined so as to be used in a TCP are used together.

A Group Manager (GM) is designed to embody the description method and the transmission method. The GM performs a group creation function, an enrollment function, an announcement function and a query function. The enrollment function is divided into a group registration function and a participant enrollment function. The GM selectively functions as a client or a server as occasion demands, and the client and the server may be respectively referred to as a Group Management Client (GMC) and a Group Management Server (GMS).

Figure 1:
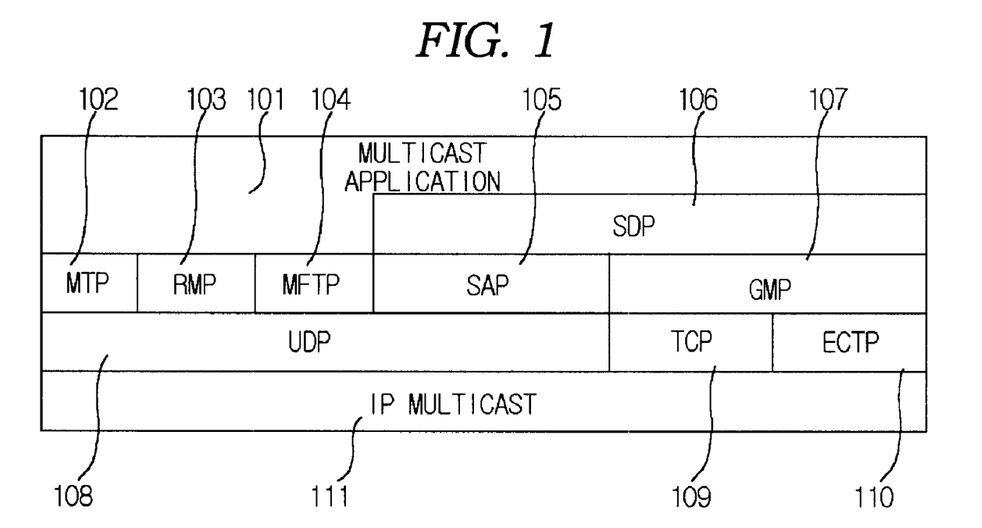
FIG. 1 is a diagram showing the structure of protocols for strictly managing group membership in an Internet multicast application.

FIG. 1 is a diagram showing the structure of protocols for strictly managing group membership in an Internet multicast application. The protocol for strictly managing group membership in Internet multicast applications consists of a multicast application 101, a Multicast Transport Protocol (MTP) 102, a Reliable Multicast Protocol (RMP) 103, a Multicast File Transfer Protocol (MFTP) 104, a Session Announcement Protocol (SAP) 105, a Session Description Protocol (SDP) 106, a Group Management Protocol (GMP) 107, a User Datagram Protocol (UDP) 108, a Transmission Control Protocol (TCP) 109, an Enhanced Communications Transport Protocol (ECTP) 110 and an IP multicast 111.

Of them, the MTP 102, the RMP 103, the MFTP 104 and the ECTP 110 are all reliable multicast transmission protocols of a transmission stratum. The group management is effectively performed by the cooperation of the strict group membership management and the reliable multicast transmission protocols.

Figure 2:
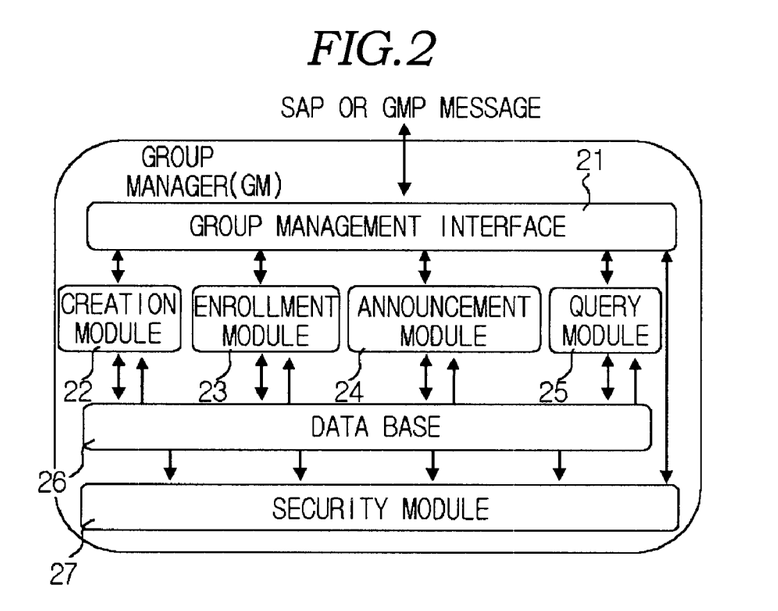
FIG. 2 is a block diagram showing the structure of the GM of FIG. 1.

FIG. 2 is a block diagram showing the structure of the GM that performs a group creation function, an enrollment function, an announcement function and a query function and that selectively functions as a client or a server as occasion demands while existing in every host system of a network.

The GM creates an SAP message and a GMP message, and transmits and receives the SAP message and the GMP message through a group management interface 21. A creation module 22 describes SDP extension information for creating a group by means of the multicast group information that is received through the group management interface 21. An enrollment module 23 performs a group registration and a participant enrollment according to the SDP information. On the basis of the above information, the announcement module 24 periodically provides an announcement service through a well-known multicast address by means of the SAP message. A query module 26 processes requests made by the GMCs that want to acquire the group information. A secure module 25 is used when a security service is required in constituting the SDP information and the SAP message.

Figure 3:
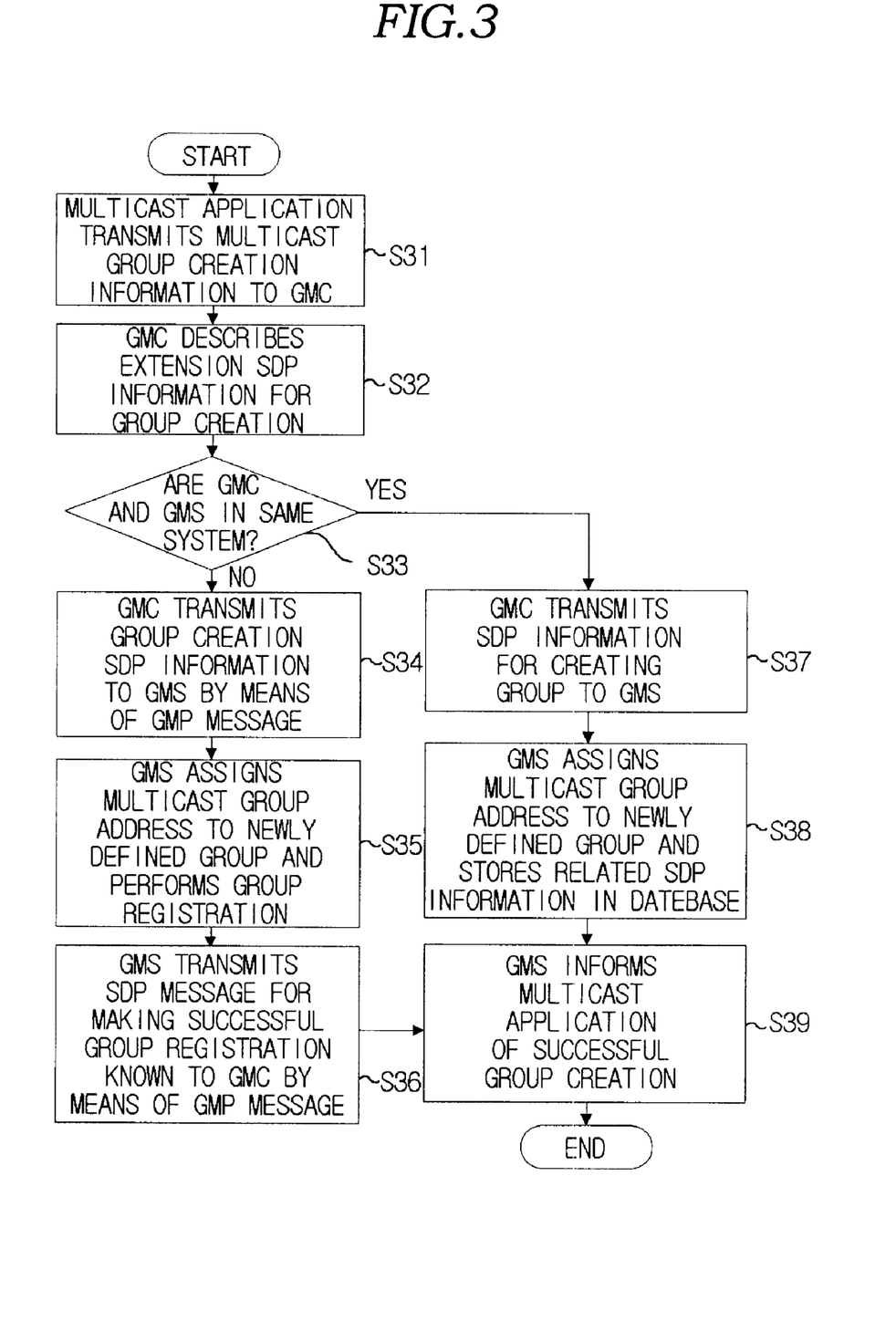
FIG. 3 is a flowchart showing the operation of the GM that performs a multicast group creation function, a group registration function and an announcement function according to an embodiment of the present invention.

FIG. 3 is a flowchart showing the operation of the GM that performs the multicast group creation function, the group registration function and the announcement function according to an embodiment of the present invention.

The multicast group creation function is performed by transmitting the group information, which is described in the form of the SDP by the GMC, to the GMS. In accordance with the fact whether the GMC and the GMS exists in the same system or not, two group creation methods are provided. That is, in case that the GMC and the GMS exists in the same system, the group creation is completed in such a way that the GMC transmits SDP information for creating a group to the GMS. On the other hand, in case that the GMC and the GMS exist in different systems, the group registration is performed in such a way that the GMC creates a group and transmits created SDP information to the GMS by means of the GMP message on a TCP connection. When the group registration is successfully completed, the GMC informs the GMC of the successful registration by means of the GMP message.

In order to make the existence of the created group known, the GMC periodically announces the group information by means of the SAP message through the well-known multicast address on the UDP. When security is required, the GMC may not announce the group information.

Referring to FIG. 3, the multicast application 101 transmits group information to the GMC so as to create a multicast group (S31). The GMC describes SDP information for creating a group (S32). When the GMC and the GMS do not exist in the same host, steps S34–S36 are performed. When the GMC and the GMS exist in the same host, steps S37–S38 are performed.

In step 34, the GMC transmits SDP information for creating a group to GMS by means of the GMP message. After receiving the SDP information, the GMS performs a group registration by assigning a group address to a new group and storing group information (S35). Subsequently, the GMS transmits a SDP message to the GMC so as to make successful group registration known (S36).

In step S37, the GMC transmits SDP information for creating a group to the GMS in the same system (S37). After receiving SDP information, the GMS performs a group registration by assigning a group address to a new group and storing group information (S38). The GMS informs the multicast application of the address information of a newly created group and successful group creation (S39).

Figure 4:
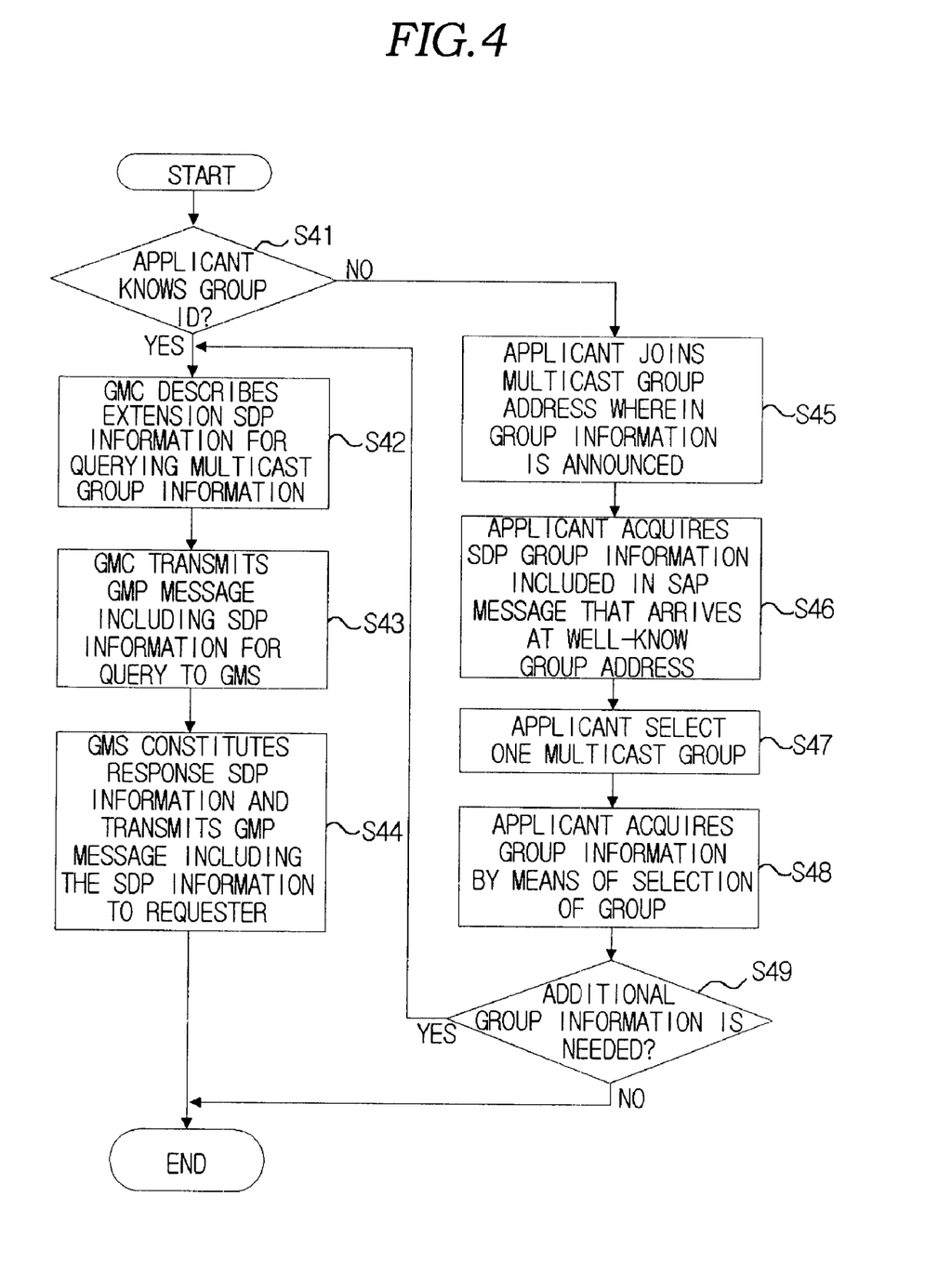
FIG. 4 is a flowchart showing the operation of the GM that performs the group query function for acquiring the detailed information of a multicast group according to another embodiment of the present invention.

FIG. 4 is a flowchart showing the operation of the GM that performs the group query function for acquiring the detailed information of a multicast group according to another embodiment of the present invention.

When it is required to know the detailed information of a corresponding multicast group so as to participate in a multicast group, the group ID of which is known, the GMC constitutes query information including the group ID and transmits it to the GMS by means of the GMP message. At this time, the group ID should be known in advance regardless of using any one of a telephone, a facsimile and an E-mail, and a decryption key should be known additionally in advance when the SDP is encrypted.

When it is required to know the group information by means of a group list that is opened to the public without the group information, the GMC should participate in an opened multicast address so as to know the group information. Afterwards, necessary information is acquired among the group information that is provided to this group address by means of the SAP message. At this time, the secret key should be known because the SDP message and the SAP message may be encrypted.

Referring to FIG. 4, it is examined whether a new applicant for participating in the group knows a group ID or not (S41). When the applicant knows the group ID, the GMC describes the group ID and constitutes SDP information for requesting corresponding multicast group information (S42). Additionally, the SDP information for a query is transmitted to the GMS through the TCP connection by means of the GMP message (S43). The GMS that received the SDP information transmits the GMP message including the SDP information to the GMC through the previously established TCP connection (S44).

On the other hand, when the applicant does not know the group ID, the applicant joins a group address to which the group information is transmitted (S45) and acquires group-related SDP information among lots of SAP messages that arrive at the group address (S46). One among multiple multicast groups is selected (S47). By means of this step, the group information is acquired (S48). At this time, when additional information is required (S49), steps S42–S44 are performed.

Figure 5:
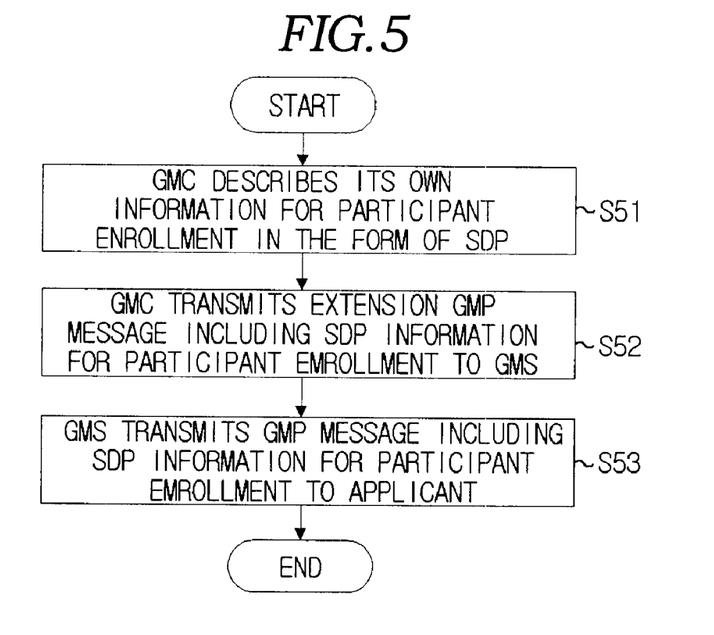
FIG. 5 is a flowchart showing the operation of the GM that performs the participant enrollment function according to a further embodiment of the present invention.

FIG. 5 is a flowchart showing the operation of the GM that performs the participant enrollment function according to a further embodiment of the present invention.

The GMC that acquired detailed information on the multicast group should be enrolled in the GMS as a participant so as to participate in actual transmission and reception of data. This is required because participants who may participate in actual service are restricted to enrolled members. Such participant enrollment is performed by transmitting the GMP message to the GMS.

Referring to FIG. 5, when the GMC requires participating in a certain multicast group, the GMC describes its own information for enrollment in the group in the form of the SDP (S51). Further, the GMC is enrolled as a participant by transmitting the GMP message carrying the SDP information to the participant GMC through the TCP connection (S52). The GMS constitutes the SDP information on successful enrollment in the group and transmits the GMP message carrying the SDP information to the applicant for participation (S53).

Figure 6:
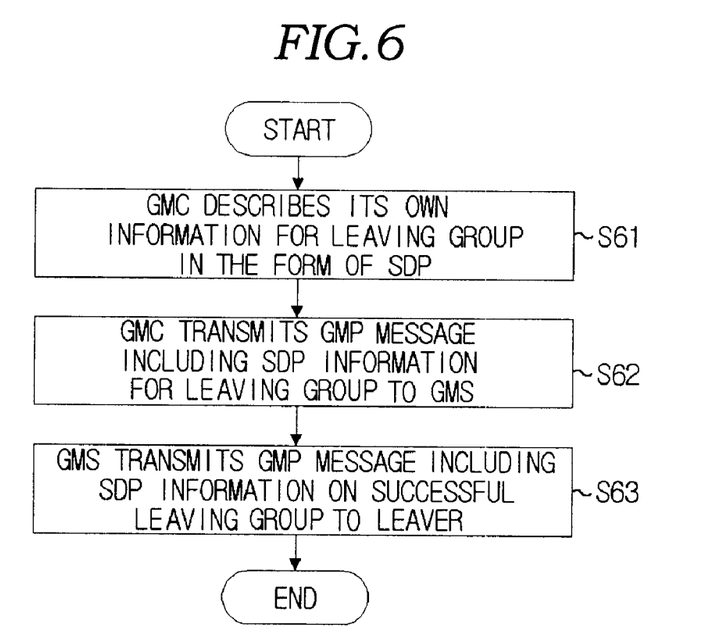
FIG. 6 is a flowchart showing the operation of the leaving function according to another embodiment.

FIG. 6 is a flowchart showing the operation of the leaving function according to another embodiment.

When a participant who is enrolled in the multicast group requires lea ing the group, SDP information for leaving is transmitted to the GMS by means of the GMP message.

Referring to FIG. 6, when the GMC requires leaving a certain multicast group, the GMC describes its own information for leaving the group in the form of the SDP extension (S61). Further, the GMC requests leaving by transmitting the GMP message carrying the SDP extension information to the GMS through the TCP connection (S62). The GMS transmits the GMP message carrying SDP response information for giving notice of a leaver successfully leaving the group to the leaver (S63).

Figure 7:
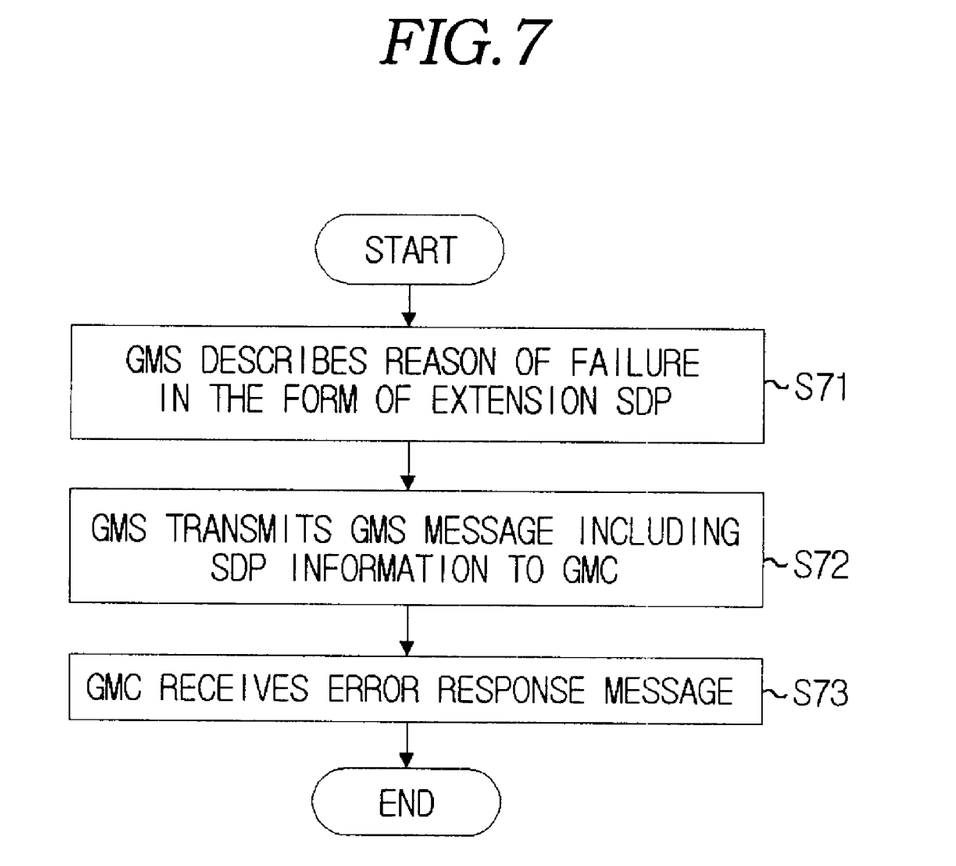
FIG. 7 is a flowchart showing the operation of the GM that performs error event response function.

FIG. 7 is a flowchart showing the operation of the GM that performs error event response function.

As illustrated in FIGS. 3–6, when inappropriate request is made or the GMS fails in processing the request in the process of group creation, query, enrollment, leaving, etc., the GMS constitutes SPD information on the cause or the reason of the failure and transmits it by means of the GMP message.

Referring to FIG. 7, when the GMS fails in responding to a request for group creation, query, enrollment or leaving, the GMS describes SDP information including an error code about the reason of the failure (S71). The GMS transmits the GMS message carrying the SDP information to the GMC through the TCP connection that is established previously so as to request service (S72). The GMC receives an error response message (S73).

Figure 8:
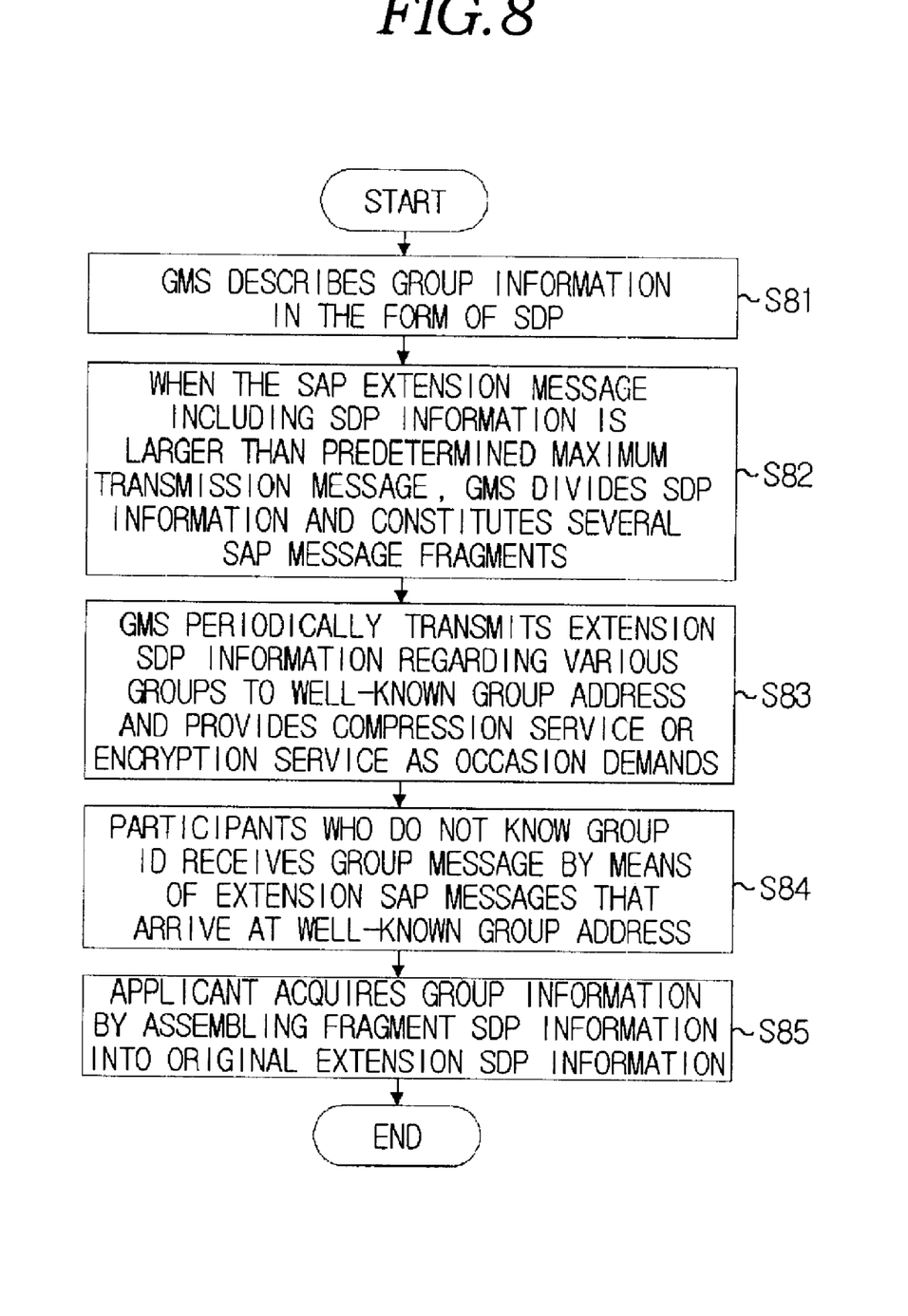
FIG. 8 is a flowchart showing the operation of GM that constitutes SDP fragment information and assembles the fragment information according to yet another embodiment.

FIG. 8 is a flowchart showing the operation of constituting SDP fragment information and assembling the fragment information at a receiving part.

As described above, the GMS may make the group information known in two ways. One is to make the group information known as a response to a query about the group through the TCP connection, and the other is to inform the multicast based on the UDP of the group information by means of the SAP message. In the latter, in accordance with the existing rule of the SAP, information of each group should be included in one SAP packet. Then, when multicast information is excessively large and exceeds a maximum transmission value, the SDP information should be divided and carried by several SAP messages. At this time, assembly information should be included in the message.

Referring to FIG. 8, the GMS describes the group information in the form of the SDP (S81). When the SAP message including the SDP information is larger than the predetermined maximum transmission value, the GMS divides the SDP information and constitutes several SAP message fragments including the divided SDP information (S82). The GMS periodically transmits the SDP information fragments regarding various groups to the well-known group address and provides compression service or encryption service with regard to every SAP message as occasion demands (S83). An applicant for participation who does not know the group ID receives the group information by means of SAP messages that arrive at the well-known group address (S84). The applicant who received the SAP message acquires the group information by assembling SDP information fragments into original SDP information on the basis of several SAP messages including the SDP information fragments (S85).

In order to perform the above processes, the SDP information includes the below-described fields. "o=" field is defined in "Request for Comment: 2327", Mark Handley and Van Jacobson, April 1998 and designates owner's information. "a=" field is a field for extending the SDP information, and so the extension functions that are defined in the present invention are described using this field. Accordingly, in order to allow the extension functions to be applicable, a part that may process the below fields should be added to the existing program.

Owner's information field:
o=<username><group id><network type><address type><address s>

The RFC 2327 Document, the field means multicast group information. However, in the extended SDP information, the field has different meanings according to the types of the messages. That is, the field has the same meaning as that in the RFC 2327 Document when used to create the group, but the field means information on a service requester when used in group query, group registration and leaving of the group.

In the extended SDP type, in order to provide group creation service, query service, enrollment service and leaving service, a message type, such as a below-described information field 1, is employed. In this information field, "smtype" designates a function extension field, and "<message type>" designates a message type according to group creation, query, group registration and leaving.

Information field 1:
a=smtype:<message type>

In using the extended SDP type, the GMS may respond to a request with a response "failure". To this end, a type, such as below-described information field 2 is employed. In this information field, "smtype" designates a function extension field, "<message type>" designates a message type according to group creation, query, group registration and leaving, and "<error code>" designates the cause and the reason of a failure using a predetermined error code.

Information field 2:
a=smtype:<message type>/<error code>

As described above, the GMS information is divided into fragments. In order to assemble SDP message that is carried by the SAP message at a receiving part, fragment numbers and a total number of fragments are provided using an information field 3 type. In this information field, "smtype" designates a function extension field, "<message type>" designates a message type according to group creation, query, group registration and leaving, <group id> is ID information that designates a certain group, <version> designates the present version of the session description protocol, <segment number> designates a fragment number, and <total number> designates a total number of fragments.

Information field 3:
A=smtype:<message type>/<group id>/<version>/
    <segment number>/<total number>

As described above, the present invention provides a method capable of easily performing strict management of group membership in Internet multicast applications based on an Internet multicast technique, thereby allowing the information of participants, who participate in a multicast group, to be easily known.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What we claim:
1. A method for strictly managing group membership in Internet multicast applications, comprising:
    a group creation and enrollment step in which a group management server creates a group and performs group registration as a group management client requests a group registration by creating group information and transmitting the information to the group management when request for multicast group creation occurs;
    a group announcement step in which the group management server announces the created group using a multicast group address;
    a group query step in which the group management client which knows a group ID inquires the group information of the group management server and acquires a response;

a group information acquisition step in which the group management client which does not know a group ID joins a known group address and acquires the group information that arrives at the known group address;

a group registration step in which the group management client enrolls in the group management server as a participant;

a group leaving step in which the group management client leaves the group by transmitting information for leaving the group to the group management server;

a failure information response step in which the group management server transmits information on a reason for failure to the group management client when the group management server fails in processing a request for group creation, query, enrollment or leaving; and a fragment message transmission step in which the group management client divides the request and transmits the fragment messages, while the group management server acquires the group information by assembling the fragment messages.

2. The method according to claim 1, wherein said group creation and enrollment step comprises:

a step in which a multicast application describes session description protocol information by transmitting group information to the group management client;

a step in which the group management client performs a group creation process by transmitting a group creation session description protocol to the group management server when the group management client and the group management server exist in the same host;

a step in which the group management client enrolls the group in the group management server by compressing or encrypting a session description protocol information on group creation and transmitting the session description protocol information to the group management message by means of a group management protocol message when the group management client and the group management server exist in different hosts;

a step in which the group management server transmits a successful group registration response to the group management client by means of a group management protocol message; and a step in which the group management client informs the Internet multicast application of successful group registration.

3. The method according to claim 1, wherein said group query step comprises:

a step in which the group management client describes a group ID and creates a query session description protocol information for requesting corresponding multicast group information;

a step in which the group management client transmits the query session description information to the group management server by means of a group management protocol message; and a step in which the group management server which receives the query session description protocol information announces the group information through a TCP by means of the group management protocol message including a response information.

4. The method according to claim 1, wherein said group registration step comprises:

a step in which the group management client describes participant enrollment information on an applicant for participation in a certain multicast group in the form of a session description protocol;

a step in which the group management client performs a participant enrollment by transmitting the participant enrollment information to the group management server by means of a group management protocol message; and a step in which the group management server informs successful group registration of the applicant by means of the group management protocol message.

5. The method according to claim 1, wherein said leaving of the group step comprises:

a step in which the group management client describes group leaving information in the form of a session description protocol;

a step in which the group management client requests group leaving by transmitting the group leaving information to the group management server by means of a group management protocol message; and a step in which the group management server which received the group leaving information informs the applicant of successful leaving of the group by means of the group management protocol message.

6. The method according to claim 1, wherein said failure information response step comprises:

a step in which the group management server describes failure information including error code about a reason of failure in the form of the session description protocol message when the group management server fails in processing the request for group creation, query, enrollment or leaving; and a step in which the group management server transmits the failure information to a service requester by means of a group management protocol message.

7. The method according to claim 1, wherein said fragment message transmission step comprises:

a step in which the group management server describes the group information in the form of a session description protocol;

a step in which the group management server divides the session description protocol and creates multiple session announcement protocol fragment messages; and a step in which an applicant for participation who received the session announcement protocol fragment messages assembles the session announcement protocol fragment messages including divided session description protocol information into original session description protocol information and acquires the group information.

8. The method according to claim 1, wherein session description protocol extension information for said group creation, query, group registration, participant enrollment and leaving is created in the form of a below-described information field 1:

Information field 1:
a=smtype:<message type>
where "smtype" designates a function extension field and "<message type>" designates a message type according to group creation, query, group registration, participant enrollment and leaving.

9. The method according to claim 1, wherein session description protocol information for said failure is created in the form of a below-described information field 2:

Information field 2:
    a=smtype:<message type>/<error code>
        where "smtype" designates a function extension field, "<message type>" designates a message type related to group creation, query, group registration, participant enrollment and leaving, and "<error code>" designates a predetermined error code.

10. The method according to claim 1, wherein said multiple session description protocol information which is divided into the multiple fragment messages is created in the form of a below-described information field 3:

Information field 3:
    A =smtype:<message type>/<group id>/<version>/<segment number>/<total number>
        where "smtype" designates a function extension field, "<message type>" designates a message type related to group creation, query, group registration, participant enrollment and leaving, <group id> is ID information that designates a certain group, <version> designates a present version of the session description protocol, <segment number> designates a fragment number, and <total number> designates a total number of fragments.

* * * * *